United States Patent
Welschof

(10) Patent No.: US 7,650,958 B2
(45) Date of Patent: Jan. 26, 2010

(54) TRACTION DRIVE HAVING AN ELECTRICAL CONVERTER

(75) Inventor: Bernward Welschof, Großostheim (DE)

(73) Assignee: Linde Material Handling GmbH, Aschaffenburg (DE)

( * ) Notice: Subject to any disclaimer, the term of this patent is extended or adjusted under 35 U.S.C. 154(b) by 610 days.

(21) Appl. No.: 11/501,481

(22) Filed: Aug. 9, 2006

(65) Prior Publication Data
US 2007/0036663 A1 Feb. 15, 2007

(30) Foreign Application Priority Data
Aug. 10, 2005 (DE) .................... 10 2005 037 727

(51) Int. Cl.
*B60K 17/00* (2006.01)
*B60K 7/00* (2006.01)
*B60K 17/14* (2006.01)
*B60K 1/00* (2006.01)

(52) U.S. Cl. .................. 180/305; 180/65.1; 180/65.21; 180/65.22; 180/65.31; 180/65.6; 180/306; 180/308

(58) Field of Classification Search ................ 180/65.1, 180/65.21, 65.22, 65.31, 65.6, 305, 306
See application file for complete search history.

(56) References Cited

U.S. PATENT DOCUMENTS

| | | | | |
|---|---|---|---|---|
| 2,023,100 A | * | 12/1935 | Rose | ............................ 315/117 |
| 5,064,013 A | * | 11/1991 | Lenz | ...................... 180/65.225 |
| 6,148,784 A | | 11/2000 | Masberg et al. | |
| 7,071,642 B2 | * | 7/2006 | Wilton et al. | ................ 318/268 |
| 7,448,460 B2 | * | 11/2008 | Morrow et al. | .............. 180/65.6 |
| 2001/0049571 A1 | * | 12/2001 | Shimizu et al. | ................ 701/22 |
| 2002/0104239 A1 | | 8/2002 | Naruse et al. | |
| 2004/0000445 A1 | * | 1/2004 | Smith et al. | ................. 180/308 |
| 2004/0244346 A1 | * | 12/2004 | Inui et al. | ..................... 56/11.9 |
| 2005/0167178 A1 | * | 8/2005 | Johnson | ....................... 180/306 |

FOREIGN PATENT DOCUMENTS

DE 100 25 089 A1 11/2001
EP 1 391 370 A1 2/2004

\* cited by examiner

*Primary Examiner*—Paul N Dickson
*Assistant Examiner*—John R Olszewski
(74) *Attorney, Agent, or Firm*—The Webb Law Firm

(57) ABSTRACT

The invention relates to a traction drive for a working machine, in particular an industrial truck, including an electrical converter having a generator (11), which is drive-connected to a combustion engine (12), and a traction motor (1 or 2), which is combined with the generator (11) in spatial terms to form one structural unit. In order to increase the performance of the traction drive whilst having a high degree of efficiency and in order to achieve a simple design, the electrical converter (generator 11, traction motors 1, 2) has, according to the invention, an operating voltage of more than 100 volts, in particular more than 200 volts, and is connected to a cooling liquid cycle.

13 Claims, 1 Drawing Sheet

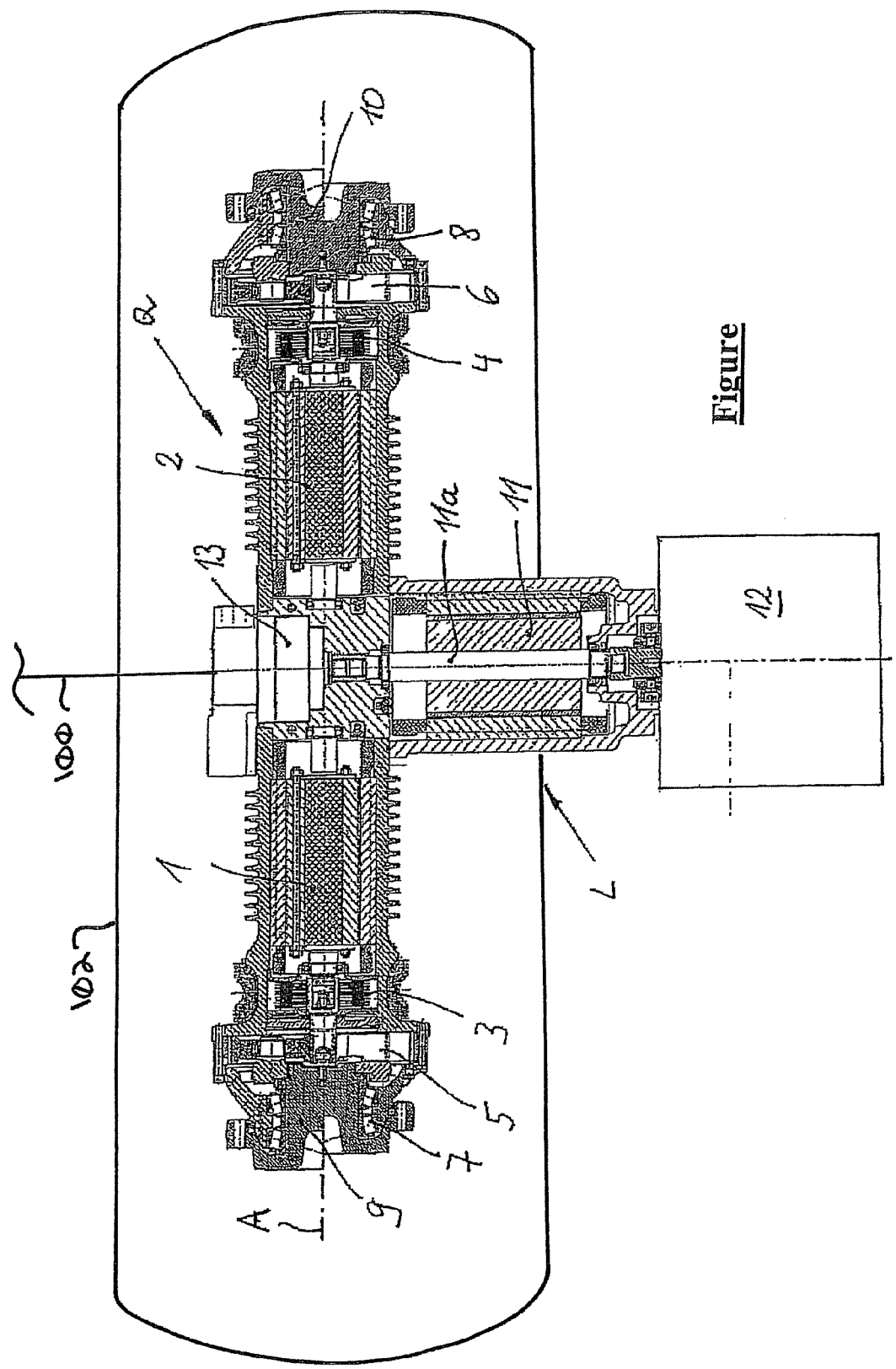
Figure

TRACTION DRIVE HAVING AN ELECTRICAL CONVERTER

CROSS-REFERENCE TO RELATED APPLICATION

This application claims priority to German Application No. 10 2005 037 727.0, filed Aug. 10, 2005, which application is herein incorporated by reference in its entirety.

BACKGROUND OF THE INVENTION

1. Field of the Invention

The invention relates to a traction drive for a working machine, in particular an industrial truck, including an electrical converter having a generator, which is drive-connected to a combustion engine, and a traction motor, which is combined with the generator in spatial terms to form one structural unit.

2. Technical Considerations

A generic traction drive is disclosed in DE 100 25 089 A1. The electrical machines generally used in the case of such traction drives are air-cooled. At a greater power demand, temperature limits are rapidly reached which could be overcome by means of liquid cooling. However, liquid cooling methods are naturally more complex and often lead to high churning losses in components in which parts rotate in liquid. The degree of efficiency is therefore impaired. In general, an attempt is therefore made to achieve the increased power demand by increasing the rotation speeds of the electrical machines. As regards the electrical machines, this is usually unproblematic, and the degree of efficiency is practically not altered in the process. However, increased power losses result in the downstream components (gear, brakes, etc.).

SUMMARY OF THE INVENTION

The present invention is based on the object of providing a generic traction drive, whose power is increased with a high degree of efficiency and which has a simple design.

This object is achieved according to the invention by providing an electrical converter having an operating voltage of more than 100 volts, such as more than 200 volts, and is connected to a cooling liquid cycle.

Owing to the operating voltage which is higher than in the case of known electrical traction drives for working machines, the torque of the electrical traction motor or the electrical traction motors is significantly increased. It is, therefore, possible to reduce the rotation speed. As a result, liquid cooling is more easily possible since the churning losses occurring at high rotation speeds, which occur in particular when the rotors of the electrical machines rotate in cooling liquid, are drastically reduced.

The reduction in the rotation speed owing to increased operating voltage also makes it possible to simplify assemblies adjacent to the traction motor or traction motors (such as reduction gear, wheel mounts, brakes, housing). For example, depending on the design, it may be possible, under certain circumstances, to dispense with a downstream reduction gear or for this reduction gear merely to have a single-stage design.

Owing to the liquid cooling, it is possible for a higher power to be transmitted using the electrical converter than using air-cooled drive units. Furthermore, all thermally sensitive parts of the compact axle, from the power controllers, through the electrical machines, their mounts and shaft sealing rings up to the gears, wheel mounts, etc., can be cooled in optimum fashion.

The temperature reduction achieved as a result of the liquid cooling in the electrical machines results in increased efficiencies.

A preferred cooling method also allows for a higher current density and, therefore, a lower current level. As a result, power controllers for the electrical machines can be used which heat up to a less severe extent and may have a smaller, i.e., more cost-effective, design.

Since the components of the electrical converter, which are subjected to a higher operating voltage, are accommodated within a closed structural unit, safer operation of the traction drive according to the invention is achieved.

In one advantageous refinement of the invention, the cooling liquid cycle is connected to a liquid cycle provided in the working machine, in particular working hydraulics of the working machine. No or only little additional complexity is, therefore, required for the liquid cooling of the electrical converter. Only cooling devices which are already provided are used in the working machine.

In addition, it has also proven advantageous if the traction motor is arranged in the axial direction of a transverse section of a drive axle. In this case, the electrical converter has a compact design and is furthermore robust owing to the integrated design, in which all of the essential components are accommodated in a protected manner, and can be used in an unrestricted manner even in unfavourable environmental conditions.

If, in one development of the invention, the generator is arranged coaxially with respect to the combustion engine and, together with the combustion engine, at right angles with respect to the transverse section of the drive axle, an optimum space-saving arrangement results for working machines with a horizontally installed combustion engine.

In one advantageous refinement of the invention, two traction motors are provided in the transverse section of the drive axle, which are arranged one behind the other, and are each associated with a wheel, and the generator is located in a region in which the traction motors are adjacent to one another. A T-shaped electrical compact axle therefore results which has a largely symmetrical design.

In this case, the generator can be arranged at least partially axially between the two traction motors, which saves space in the longitudinal direction of the vehicle.

In both cases, it is possible for the generator to have a continuous drive shaft, which is drive-connected to a pump at the end remote from the combustion engine. In this manner, the combustion engine can drive a further load in addition to the traction drive.

The pump can be arranged at least partially axially between the traction motors.

The pump is expediently connected to working hydraulics.

BRIEF DESCRIPTION OF THE DRAWING

Further advantages and details of the invention will be explained in more detail with reference to the exemplary embodiment illustrated in the schematic FIGURE.

DESCRIPTION OF THE PREFERRED EMBODIMENTS

In the present exemplary embodiment, the traction drive according to the invention has an electrical converter, which is integrated in a drive axle. In this case, in a transverse section Q of the drive axle, two electrical traction motors 1, 2 are arranged axially, one behind the other, in the axial direction and are spaced apart from one another. The two traction motors 1, 2, which are preferably in the form of three-phase synchronous motors or in the form of three-phase asynchronous motors, each have a multiple-disc brake 3 and 4, respectively, and a reduction gear 5 and 6, respectively, connected downstream of them, the reduction gear being in the form of a single-stage planetary gear. In each case, one wheel mount 7 or 8 of a wheel hub 9 or 10 is located at the axle ends.

The traction motors 1, 2 and the downstream components are arranged coaxially with respect to an axle center line A. An arrangement is, of course, also possible in which the axle center line A is offset with respect to the drive shafts of the traction motors 1, 2, for example when spur gears are used in place of planetary gears as the reduction gear 5 or 6. It goes without saying that an individual traction motor can also be arranged in the drive axle in place of two electrical traction motors 1, 2, in this case a differential gear being connected downstream of the individual traction motor, the two outputs of the differential gear each being connected to one of the wheel hubs 9 or 10.

The traction drive according to the invention has a generator 11, which is arranged in the center of the axle and at right angles with respect to the traction motors 1, 2 and is drive-connected to a combustion engine 12 coaxial thereto. The generator 11 is electrically connected to the two traction motors 1, 2 and, together with the traction motors 1, 2, forms an electrical converter. The drive axle of the traction drive according to the invention is, therefore, in the form of a T and comprises a transverse section Q, which is essentially formed by the traction motors 1, 2 (and the downstream components), and a longitudinal section L, namely the generator 11.

This design, which can also be referred to as an electrical compact axle, is primarily suitable in the case of a horizontally-installed combustion engine 12. In principle, other designs are, of course, also possible, in which the generator 11 of the electrical converter is arranged, for example, parallel to the traction motors. A variant embodiment with only one traction motor and one generator, which is arranged coaxially with respect thereto, is also conceivable.

A drive shaft 11*a* of the generator 11 has a continuous design and is connected to a pump 13, which is located axially between the two traction motors 1, 2 in the drive axle. It is also possible for the generator 11 to be arranged at least partially axially between the traction motors 1, 2, in which case the pump 13, which is arranged in series behind this, protrudes out of the transverse section Q of the drive axle formed by the traction motors 1, 2. The pump 13 is preferably part of working hydraulics 100 of a working machine equipped with the drive axle, for example a fork-lift truck.

According to the invention, the electrical converter is operated at an operating voltage of more than 100 volts, in one particular embodiment more than 200 volts. In this case, for example, an operating voltage of 400 volts is easily possible. The increased operating voltage makes it possible to increase the torque of the electrical traction motors 1, 2 and, therefore, to reduce the output drive rotation speed.

The working hydraulics 100 are used for cooling the electrical compact axle. In this case, a cooling cycle 102 is connected to the working hydraulics 100 and supplies the generator 11 and the traction motors 1, 2, as well as the downstream components, with cooled hydraulic liquid from the working hydraulics. In this case, it is possible to directly cool the electrical machines by the rotors dipping into hydraulic oil, or to cool them indirectly by cooling channels being provided in the housing or other machine areas. The liquid cooling brings about a reduction in the temperature in the electrical machines and, therefore, improves efficiency.

The FIGURE does not illustrate power controllers (power modules) which are flange-connected onto the drive axle and are used to control the rotation speed and torque of the electrical converter. The power controllers are also connected to the cooling liquid cycle (directly or indirectly).

For cooling purposes, a liquid cycle which is already provided in the working machine (also conceivable is the cooling cycle of the combustion engine) and its cooling devices (such as oil coolers, possibly fans) are therefore used. The cooling, as is illustrated, can be assisted by fluting of the drive axle.

The churning losses occurring at high rotation speeds during liquid cooling are avoided or considerably reduced in the case of the present traction drive since it is possible for the rotation speed of the electrical machines to be considerably reduced, owing to the high operating voltage and the high torque which is achieved as a result.

The reduction in rotation speed owing to the increased operating voltage also makes it possible for the reduction gear, as in the present exemplary embodiment, only to have a single-stage design or to be dispensed with entirely, under certain circumstances. The churning and frictional losses in the multiple-disc brakes are also reduced.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A traction drive for a working machine, comprising:
   an electrical converter comprising a generator drive-connected to a combustion engine; and
   at least one traction motor combined with the generator in spatial terms to form one structural unit,
   wherein the electrical converter has an operating voltage of more than 100 volts and is connected to a cooling liquid cycle, and wherein the cooling liquid cycle is connected to a liquid cycle of working hydraulics of the working machine.

2. The traction drive according to claim 1, wherein the traction motor is arranged in an axial direction of a transverse section of a drive axle.

3. The traction drive according to claim 2, wherein the generator is arranged coaxially with respect to a combustion engine and, together with the combustion engine, at right angles with respect to the transverse section of the drive axle.

4. The traction drive according to claim 3, wherein two traction motors are provided in a transverse section of the drive axle which are arranged one behind the other and are each associated with a wheel, and the generator is located in a region in which the traction motors are adjacent to one another.

5. The traction drive according to claim 2, wherein two traction motors are provided in a transverse section of the drive axle which are arranged one behind the other and are each associated with a wheel, and the generator is located in a region in which the traction motors are adjacent to one another.

6. The traction drive according to claim 5, wherein the generator is arranged at least partially axially between the two traction motors.

7. The traction drive according to claim 6, wherein the generator has a continuous drive shaft, which is drive-connected to a pump at an end remote from the combustion engine.

8. The traction drive according to claim 1, wherein the electrical converter has an operating voltage of more than 200 volts.

9. A traction drive for a working machine, comprising:
   an electrical converter comprising a generator drive-connected to a combustion engine; and
   at least one traction motor combined with the generator in spatial terms to form one structural unit,
   wherein the electrical converter has an operating voltage of more than 100 volts and is connected to a cooling liquid cycle,
   wherein the traction motor is arranged in an axial direction of a transverse section of a drive axle,
   wherein the generator is arranged coaxially with respect to a combustion engine and, together with the combustion engine, at right angles with respect to the transverse section of the drive axle, and
   wherein the generator has a continuous drive shaft, which is drive-connected to a pump at an end remote from the combustion engine.

10. The traction drive according to claim 9, wherein the pump is arranged at least partially axially between the traction motors.

11. The traction drive according to claim 10, wherein the pump is connected to working hydraulics.

12. The traction drive according to claim 9, wherein the pump is connected to working hydraulics.

13. A traction drive for a working machine, comprising:
   an electrical converter comprising a generator drive-connected to a combustion engine; and
   at least one traction motor combined with the generator in spatial terms to form one structural unit,
   wherein the electrical converter has an operating voltage of more than 100 volts and is connected to a cooling liquid cycle,
   wherein the traction motor is arranged in an axial direction of a transverse section of a drive axle,
   wherein two traction motors are provided in a transverse section of the drive axle which are arranged one behind the other and are each associated with a wheel, and the generator is located in a region in which the traction motors are adjacent to one another, and
   wherein the generator has a continuous drive shaft, which is drive-connected to a pump at an end remote from the combustion engine.

* * * * *

UNITED STATES PATENT AND TRADEMARK OFFICE
CERTIFICATE OF CORRECTION

PATENT NO.        : 7,650,958 B2
APPLICATION NO. : 11/501481
DATED             : January 26, 2010
INVENTOR(S)       : Bernward Welschof It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Twenty-third Day of November, 2010

David J. Kappos
*Director of the United States Patent and Trademark Office*